United States Patent [19]

Ashfield et al.

[11] 3,884,335
[45] May 20, 1975

[54] DUAL CLUTCHES WITH SPLASH & GRAVITY COOLING CIRCUITS

[75] Inventors: Herbert Edward Ashfield; Thomas Eastwood, both of Huddersfield, England

[73] Assignee: David Brown Tractors Limited, Huddersfield, England

[22] Filed: Mar. 11, 1974

[21] Appl. No.: 449,682

[52] U.S. Cl............................................ 192/113 B
[51] Int. Cl............................................ F16d 13/72
[58] Field of Search................................ 192/113 A

[56] References Cited
UNITED STATES PATENTS

| 3,366,210 | 1/1968 | Webster | 192/113 B |
| 3,734,259 | 5/1973 | Ashfield | 192/113 B |

Primary Examiner—Benjamin W. Wyche
Attorney, Agent, or Firm—Norris & Bateman

[57] ABSTRACT

An engine/clutch combination has an engine-driven flywheel on which is mounted a clutch mechanism for disengagably connecting the flywheel selectively to a shaft or to the shaft and to a sleeve surrounding said shaft. A clutch housing, the lower portion of which forms a sump containing oil, envelops the flywheel and clutch mechanism and has a trough within it forming a well which accommodates the lower portions of said flywheel and clutch mechanism. An aperture is formed in the trough for allowing oil to flow from a space between the trough and the clutch housing to an annular groove formed in that face of the flywheel remote from the clutch mechanism, from which it flows via passages in the flywheel to that part of the clutch mechanism associated with the shaft and via further passages in the flywheel to that part of the clutch mechanism associated with the sleeve, and thence to the trough. The oil is centrifugally flung out of the trough by the rotation of the flywheel and clutch mechanism, collected by gravity flow to the aforementioned space, and made available for recirculation through the clutch.

5 Claims, 3 Drawing Figures

DUAL CLUTCHES WITH SPLASH & GRAVITY COOLING CIRCUITS

CROSS-REFERENCE TO RELATED APPLICATION

The invention concerns an improvement in or modification of that forming the subject of our prior U.S. Pat. No. 3,734,259.

BACKGROUND OF INVENTION

The invention relates to engine/clutch combinations, particularly but not exclusively for land vehicles, and has for its object to enable a wet dual clutch, which requires a copious supply of oil for lubrication and cooling at times of engagement and disengagement, to be employed without the need for a separate pump to supply said oil.

SUMMARY OF INVENTION

According to the invention, an engine/clutch combination comprises an engine flywheel, a shaft co-axial with the flywheel, a sleeve surrounding the shaft, a clutch mechanism including at least one clutch plate mounted on the shaft and frictionally engageable between an axially moveable pressure plate and the flywheel and at least one clutch plate mounted on the sleeve and frictionally engageable by axial movement of another pressure plate, a stationary clutch housing enveloping the flywheel and the clutch mechanism and acting at its base as a sump, a trough within the housing forming a well accommodating the lower portions of the flywheel and the clutch mechanism and surrounded by oil in the sump, means defining a space separate from the sump between the trough and the clutch housing for collecting oil flung from the rotating flywheel and clutch mechanism and impeding its direct return to the trough, means defining an aperture in the trough adjacent that face of the flywheel remote from the clutch mechanism, an annular groove in said face of the flywheel for receiving oil flowing through the aperture from the space, at least one passage in the flywheel for delivering oil from the groove to the clutch plate on the shaft, and at least one further passage in the flywheel for delivering oil from the groove to the clutch plate on the sleeve.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 1:
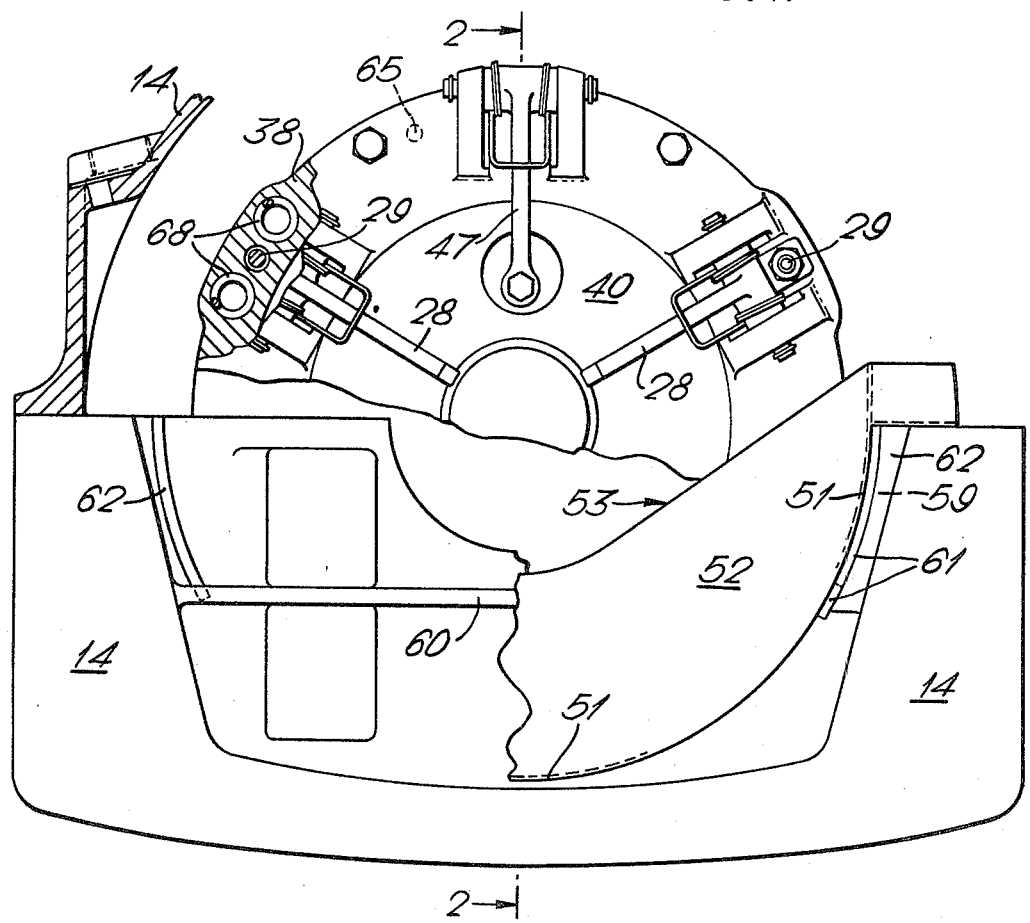
FIG. 1 is a rear elevation of a clutch with parts broken away for clarity.

Referring now to the drawings, an agricultural tractor has an engine 10 including a crankshaft 11 and a flywheel 12 secured by bolts 13 to the crankshaft 11. A clutch housing 14 which envelops the flywheel 12 is secured to the engine 10, and contains part of a power take-off shaft 15 co-axial with the crankshaft 11, that end of the power take-off shaft 15 adjacent the crankshaft 11 being carried by a bearing 16 housed in the flywheel 12. The power take-off shaft 15 is provided with external splines 17 near its end adjacent the crankshaft 11, on which there is slidably mounted a hub 18 to which there is rivetted a clutch plate 19 having so-called "paper" linings 20. The plate 19 is frictionally engaged between a face 21 on the flywheel 12 and a pressure plate 22 by a set of helical compression springs 23 and a set of auxiliary helical compression springs 68, and can be disengaged by conventional means comprising a hand lever (not shown), a rotatable shaft 24 on which said lever is secured, a forked arm 25 also secured on the shaft 24, a sleeve 26 slideable axially on a fixed sleeve 27 by the arm 25, first class levers 28 moveable by the sleeve 26, and pull rods in the form of bolts 29 connecting the levers 28 to the pressure plate 22.

Surrounding the power take-off shaft 15 is a sleeve 30 rotatable independently thereof which constitutes the input shaft of the tractor's power transmission gearbox (not shown). That end of the sleeve 30 adjacent the crankshaft 11 is provided with external splines 31 on which there is slidably mounted a hub 32 having external splines 33 on which there are slidably mounted two clutch plates 34 each having "paper" linings 35. Interposed between the two clutch plates 34 is an unlined clutch plate 36 carried by internal splines 37 formed in a casing 38 secured to the flywheel 12. The flywheel 12 and the casing 38 contain peripheral apertures 39 and said casing includes an inwardly directed flange 40 at its end remote from the flywheel 12, said flange housing a bearing 41 which supports the sleeve 30 near the front end thereof on that side of the hub 32 remote from the crankshaft 11. The plates 34, 36 are frictionally engaged between a face 42 on the flange 40 and a pressure plate 43 by the aforementioned set of springs 23 and can be disengaged by conventional means comprising a foot pedal (not shown), a rotatable shaft 44 on which said pedal is secured, a forked arm 45 also secured on the shaft 44, a sleeve assembly 46 surrounding the sleeve 26 and slideable axially by the arm 45, second class levers 47 moveable by the sleeve assembly 46, and push rods in the form of plungers 48 disposed between the levers 47 and the pressure plate 43. The pressure plate 22 has peripheral projections 49 slideable axially in the peripheral apertures 39 in the flywheel 12, and the pressure plate 43 has peripheral projections 50 slideable axially in the peripheral apertures 39 in the casing 38, relative rotational movement between the two pressure plates 22, 43 on the one hand and the flywheel 12 and the casing 38 on the other hand being thereby prevented.

The lower part of the clutch housing 14 constitutes a sump within which there is secured a sheet metal trough, the base and sides of said trough being formed by an arcuate member 51 of an internal radius rather larger than the maximum external radius of the flywheel 12 and the components carried thereby, the lower portions of said flywheel and components being accommodated in said trough, and the ends 52 of the trough being vertical with their upper edges 53 of shallow V-shape. An annular groove 54 is formed in that face of the flywheel 12 adjacent the engine 10 and an annular plate 55 secured to the flywheel 12 projects radially inwards over the outer zone of said groove. A notch 56 having a radius slightly smaller than the radius of the annular plate 55 is formed by the apex of the V-shaped upper edge 53 of that end 52 of the trough adjacent said face of the flywheel 12, and has a lip 57 curled towards the groove 54. The trough has an orifice 58 of predetermined size formed in its base to enable its interior to communicate with the bottom of the sump, and a space or gutter 59 is formed by a rib 60 which is cast integrally with the clutch housing 14, carries a strip 61 of resilient oil-resistant plastics material which makes sealing contact with that end 52 of the trough in which there is formed the notch 56 and with both sides of the trough at a level between the notch 56 and the base of the trough, and has portions 62 extending upwards to a point above the level of oil in the sump.

Figure 3:
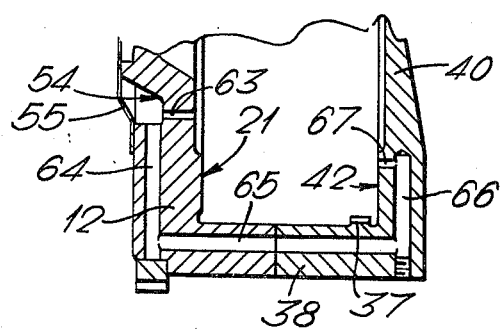
FIG. 3 is a sectional view of a detail.
Figure 2:
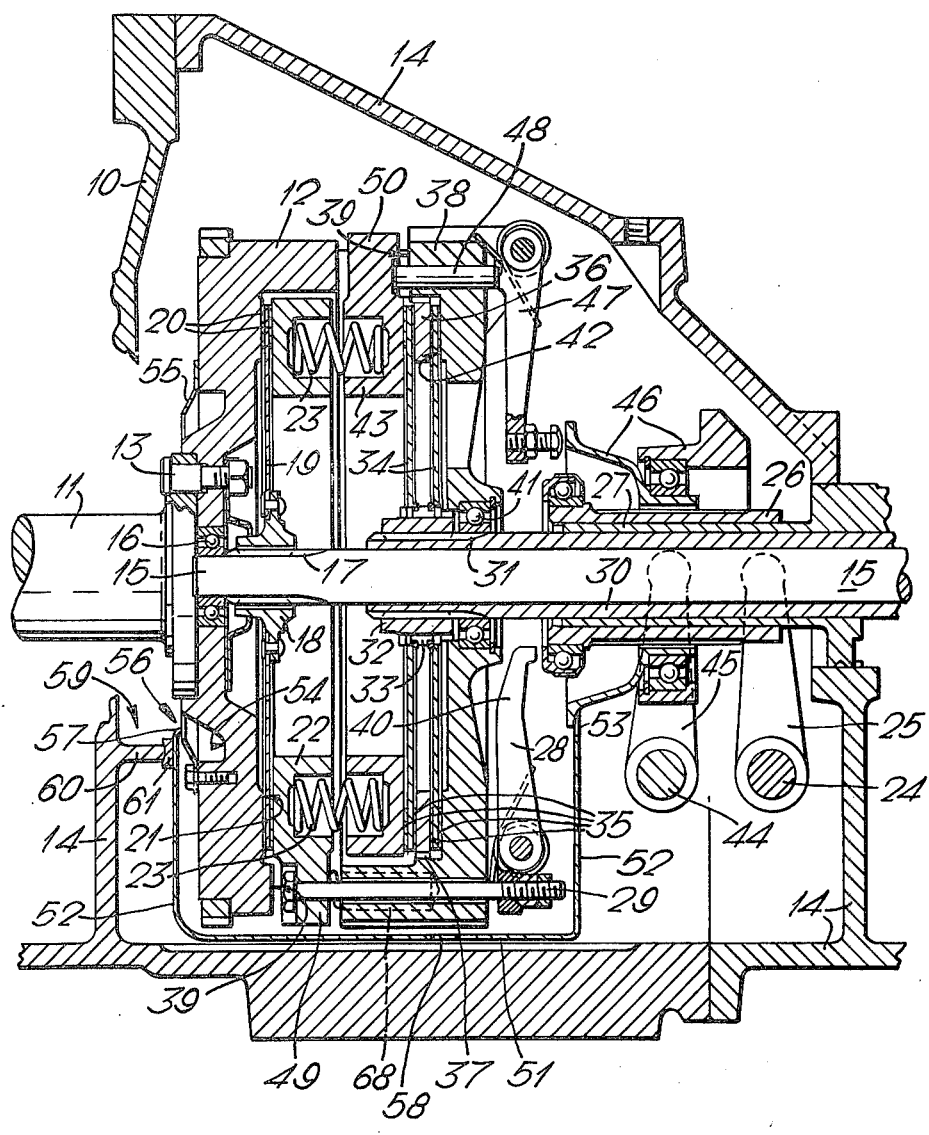
FIG. 2 is a section on the line 2—2 in FIG. 1 of the clutch and part of an engine in combination with which it is secured and operates.

Referring now to FIG. 3, three circumferentially equally spaced passages for leading oil from the annular groove 54 to the clutch plate 19 on the shaft 15 each comprises an axially extending hole 63 drilled through the flywheel 12 from the outer zone of said groove, and three further circumferentially equally spaced passages for leading oil from the groove 54 to the clutch plates 34 on the sleeve 30 each comprises a conduit 64 leading radially outwards from the outer zone of said groove to an axially extending conduit 65 having aligned portions in the flywheel 12 and in the casing 38 respectively and leading in turn to a conduit 66 leading radially inwards to an axially extending hole 67 drilled in the face 42 on the flange 40, the conduit 66 being of shorter length than the conduit 64 so as to cause a positive flow of oil from the groove 54 to the hole 57 by the action of centrifugal force. The relative lengths of the conduits 64 and 66 and the cross-sectional areas of the holes 63 and 67 are so arranged that the flow of oil is suitably shared between the clutch plate 19 and the clutch plates 34. The clutch plates 19 and 34 have apertures (not shown) of known type to permit the oil to reach all of their respective linings 20 and 35.

In operation, when the engine 10 is inoperative, oil is at the same level in both the sump and the trough due to the provision of the orifice 58. When the engine 10 is made operative and the flywheel 12 and the components carried thereby commence to rotate, said flywheel and components fling oil out of the trough at a faster rate than it can enter through the orifice 58. The oil thus flung from the trough impinges on the interior walls of the clutch housing 14 and flows down them, and a large proportion of said oil flows into the space or gutter 59. This oil then flows from the space or gutter 59 through the notch 56 into the annular groove 54 in the flywheel 12, and thence due to the action of centrifugal force through the holes 63 to the clutch plate 19 and through the conduits 64, 65 and 66 and the hole 67 to the clutch plates 34. The oil subsequently escapes from the interior of the flywheel 12 and the casing 38 through the peripheral apertures 39 and is then flung on to the interior walls of the clutch housing 14 once again so that the oil circulates in a continuous cycle. Some oil continuously enters the trough by way of the orifice 58 to replace that oil which flows down the interior walls of the clutch housing 14 into the sump instead of into the trough. This has the advantage that relatively cool oil from the bottom of the sump is continuously brought into use whilst some of the hot oil which has circulated through the clutches returns directly to the sump where it can cool before being recirculated.

In a modification, sintered bronze linings are employed instead of "paper" linings. In another modification, the space or gutter 59 extends only along that one of the sides of the trough adjacent that side of the clutch housing 14 on which the majority of the oil flung from the trough impinges due to the unidirectional rotation of the engine 10. The numbers of clutch plates on the power take-off shaft 15 and on the sleeve 30 can be varied to suit the torque to be transmitted and the clutch operating forces required. Other sorts of dual clutches, for example with a single foot pedal arranged to operate the two clutches sequentially, can be employed.

We claim:

1. An engine/clutch combination comprising an engine flywheel, a shaft co-axial with the flywheel, a sleeve surrounding the shaft, a clutch mechanism including at least one clutch plate mounted on the shaft and frictionally engageable between an axially moveable pressure plate and the flywheel and at least one clutch plate mounted on the sleeve and frictionally engageable by axial movement of another pressure plate, a stationary clutch housing enveloping the flywheel and the clutch mechanism and acting at its base as a sump, a trough within the housing forming a well accommodating the lower portions of the flywheel and the clutch mechanism and surrounded by oil in the sump, means defining a space separate from the sump between the trough and the clutch housing for collecting oil flung from the rotating flywheel and clutch mechanism and impeding its direct return to the trough, means defining an aperture in the trough adjacent that face of the flywheel remote from the clutch mechanism, an annular groove in said face of the flywheel for receiving oil flowing through the aperture from the space, at least one passage in the flywheel for delivering oil from the groove to the clutch plate on the shaft, and at least one further passage in the flywheel for delivering oil from the groove to the clutch plate on the sleeve.

2. An engine/clutch combination according to claim 1, wherein the passage leads to that side adjacent the flywheel of the clutch plate on the shaft, and the further passage leads to that side remote from the flywheel of the clutch plate on the sleeve.

3. An engine/clutch combination according to claim 1, wherein the further passage comprises a conduit leading radially outwards to an axially extending conduit leading in turn to a conduit leading radially inwards and of shorter length than the conduit leading radially outwards.

4. An engine/clutch combination according to claim 1, wherein the means defining the space comprise a rib which is on the clutch housing, makes sealing contact with that end of the trough in which there is formed the aperture and with at least one side of the trough at a level between the aperture and the base of the trough, and has end portions extending upwards to a point above the level of oil in the sump.

5. An engine/clutch combination according to claim 1, wherein the trough has an orifice of predetermined size in its base to enable its interior to communicate with the bottom of the sump.

* * * * *

UNITED STATES PATENT OFFICE
CERTIFICATE OF CORRECTION

Patent No. 3,884,335   Dated May 20, 1975

Inventor(s) Herbert E. Ashfield et al

It is certified that error appears in the above-identified patent and that said Letters Patent are hereby corrected as shown below:

On the first page the foreign application priority data was ommitted. Please insert the following after the application number:

Foreign Application Priority Data

April 6, 1973 Great Britain..........16527/73

Signed and Sealed this second Day of December 1975

[SEAL]

Attest:

RUTH C. MASON
*Attesting Officer*

C. MARSHALL DANN
*Commissioner of Patents and Trademarks*